(12) United States Patent
Bhaduri et al.

(10) Patent No.: US 7,846,404 B2
(45) Date of Patent: *Dec. 7, 2010

(54) PROCESS FOR SEPARATING AND RECOVERING BASE METALS FROM USED HYDROPROCESSING CATALYST

(75) Inventors: Rahul S. Bhaduri, Moraga, CA (US); John Stiksma, St. Albert (CA); Roman Berezowsky, St. Albert (CA)

(73) Assignee: Chevron U.S.A. Inc., San Ramon, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/340,404

(22) Filed: Dec. 19, 2008

(65) Prior Publication Data

US 2009/0133536 A1 May 28, 2009

Related U.S. Application Data

(63) Continuation-in-part of application No. 11/946,736, filed on Nov. 28, 2007, now Pat. No. 7,658,895.

(51) Int. Cl.
*C01G 37/00* (2006.01)

(52) U.S. Cl. .............................. 423/56; 423/55; 423/67; 423/68; 423/40

(58) Field of Classification Search .................. 423/56, 423/55, 67, 68, 40
See application file for complete search history.

(56) References Cited

U.S. PATENT DOCUMENTS 3,455,677 A 7/1969 Litz
3,763,303 A 10/1973 Khuri et al.
3,903,241 A 9/1975 Stevens et al.
4,131,455 A 12/1978 Edwards et al.
4,145,397 A 3/1979 Toida et al.
4,216,118 A 8/1980 Yoshida et al.
4,220,634 A 9/1980 Deschamps et al.
4,374,100 A 2/1983 Sebenik et al.
4,409,190 A 10/1983 Van Leirsburg
4,417,972 A 11/1983 Francis et al.
4,432,953 A 2/1984 Hubred et al.
4,434,043 A 2/1984 Singhal et al.

(Continued)

FOREIGN PATENT DOCUMENTS

JP 6228666 A2 8/1994

*Primary Examiner*—Melvin C Mayes
*Assistant Examiner*—Melissa Stalder
(74) *Attorney, Agent, or Firm*—Steven R. Ellinwood

(57) ABSTRACT

A method is disclosed for separating and recovering base metals from a used hydroprocessing catalyst originating from Group VIB and Group VIII metals and containing at least a Group VB metal. In one embodiment, the used catalyst is contacted with an ammonia leaching solution to dissolve and separate the Group VIB and VIII metals from the Group VB metal complex and coke associated with the used catalyst. The resulting Group VIB and VIII metal containing solution is processed through at least two additional precipitation and liquid/solid separation steps to produce, in separate processing streams, a Group VIB metal product solution (such as ammonium molybdate) and a Group VIII metal product solution (such as nickel sulfate). Additionally, two separate filtrate streams are generated from liquid-solid separation steps, which filtrate streams are combined and subjected to hydrolysis and oxidation (oxydrolysis) to generate a purified ammonium sulfate solution for further processing, such as for fertilizer.

34 Claims, 1 Drawing Sheet

U.S. PATENT DOCUMENTS

| | | | |
|---|---|---|---|
| 4,500,495 A | 2/1985 | Hubred et al. | |
| 4,541,868 A | 9/1985 | Lowenhaupt et al. | |
| 4,548,700 A | 10/1985 | Bearden, Jr. et al. | |
| 4,554,138 A | 11/1985 | Marcantonio | |
| 4,661,265 A | 4/1987 | Olson et al. | |
| 4,762,812 A | 8/1988 | Lopez et al. | |
| 4,832,925 A | 5/1989 | Weir et al. | |
| 4,861,565 A | 8/1989 | Sefton et al. | |
| 4,900,522 A | 2/1990 | Chou et al. | |
| 5,099,047 A | 3/1992 | Sato et al. | |
| 5,246,570 A | 9/1993 | Cronauer et al. | |
| 5,415,849 A | 5/1995 | Toyabe et al. | |
| 5,457,258 A | 10/1995 | Hommeltoft et al. | |
| 5,505,857 A | 4/1996 | Misra et al. | |
| 5,573,556 A | 11/1996 | Wen | |
| 6,153,155 A | 11/2000 | Wen et al. | |
| 6,180,072 B1 | 1/2001 | Veal et al. | |
| 6,589,492 B2 | 7/2003 | Matsumoto et al. | |
| 6,673,732 B2 | 1/2004 | Muhler et al. | |
| 6,733,564 B1 | 5/2004 | Sahu et al. | |
| 7,033,480 B2 | 4/2006 | King | |
| 7,067,090 B2 | 6/2006 | Han et al. | |
| 7,182,926 B2 | 2/2007 | Akahoshi | |
| 7,255,795 B2 | 8/2007 | Panariti et al. | |
| 2003/0130118 A1 | 7/2003 | Koyama et al. | |
| 2004/0219082 A1 | 11/2004 | Matjie et al. | |
| 2004/0237720 A1 | 12/2004 | Moyes et al. | |
| 2004/0241066 A1 | 12/2004 | Jasra et al. | |
| 2005/0118081 A1 | 6/2005 | Harris et al. | |
| 2005/0249652 A1 | 11/2005 | Scharifker et al. | |
| 2006/0051875 A1 | 3/2006 | Reppy et al. | |
| 2006/0135631 A1 | 6/2006 | Kopponen et al. | |
| 2006/0151399 A1 | 7/2006 | Brandts et al. | |
| 2006/0258531 A1 | 11/2006 | Koyama et al. | |
| 2007/0025899 A1 | 2/2007 | Marcantonio | |
| 2007/0098609 A1 | 5/2007 | McConnell | |
| 2007/0144944 A1 | 6/2007 | Del Bianco et al. | |

US 7,846,404 B2

PROCESS FOR SEPARATING AND RECOVERING BASE METALS FROM USED HYDROPROCESSING CATALYST

RELATED APPLICATIONS

This application is a continuation-in-part of and claims priority to U.S. patent application Ser. No. 11/946,736 filed Nov. 28, 2007, now U.S. Pat. No. 7,658,895.

TECHNICAL FIELD

The invention relates to a process for separating and recovering metals from used hydroprocessing catalyst.

BACKGROUND

Catalysts have been used widely in the refining and chemical processing industries for many years. Hydroprocessing catalysts, including hydrotreating and hydrocracking catalysts, are now widely employed in facilities worldwide. Used and "spent" hydroprocessing catalysts discharged from these facilities typically contain metal components such as molybdenum, nickel, cobalt, vanadium, and the like.

With the advent of the need to refine heavier crude feedstock, refiners are forced to use more catalysts than before for hydroprocessing to remove metals, sulfur and other contaminants from the feedstock. These catalytic processes generate huge quantities of spent catalyst. With the increasing demand and market price for metal values and environmental awareness thereof, catalysts can serve as an economic source for recovery of metals useful for catalyst synthesis and other uses.

In order to recycle catalytic metals and provide a renewable source for the metals, efforts have been made to extract metals from spent catalysts, whether in supported or bulk catalyst form. US Patent Publication No. 2007/0025899 discloses a process to recover metals such as molybdenum, nickel, and vanadium from a spent catalyst with a plurality of steps and equipment to recover the molybdenum and nickel metal complexes. U.S. Pat. No. 6,180,072 discloses another complex process requiring solvent extraction as well as oxidation steps to recover metals from spent catalysts containing at least a metal sulphide.

There is still a need for an improved and simplified process to recover metals including but not limited to molybdenum, nickel, and vanadium from used hydroprocessing catalysts.

SUMMARY OF THE INVENTION

In one aspect, the invention relates to a method for recovering base metals including vanadium from a used dispersed catalyst originating from a Group VIB metal sulfide catalyst promoted with a Group VIII metal for hydrocarbon oil hydroprocessing, the method comprising the steps of: contacting the used catalyst with a leaching solution containing ammonia and air to dissolve the group VIB metal and the Group VIII metal into the leaching solution, forming a pressure leach slurry containing at least a group VIB soluble metal complex, at least a group VIII soluble metal complex, ammonium sulphate and a first solid residue containing ammonium metavanadate and coke; separating and removing the first solid residue containing ammonium metavanadate and coke from the pressure leach slurry to form a first pressure leach solution; precipitating from the first pressure leach solution at least a portion of the Group VIB metal and at least a portion of the Group VIII metal, wherein the precipitation is carried out at a first pre-selected pH to precipitate a second solid residue comprising as metal complexes at least a portion of the Group VIB metal and at least a portion of the Group VIII metal and forming a first slurry comprising at least a portion of the Group VIII soluble metal complex; separating from the first slurry the second solid residue and a primary filtrate substantially free of Group VB, Group VIB and the Group VIII metals; dissolving the second solid residue, at a second pre-selected pH, to form a group VIB metal precipitate and a group VIII metal containing solution; separating the group VIB metal precipitate from the Group VIII metal containing solution and dissolving said Group VIB metal precipitate in a dilute base at a sufficient temperature to form a Group VIB metal product.

In another aspect, the invention relates to a method for recovering vanadium, molybdenum and nickel from the used catalyst to recover substantial amounts of a Group VIII metal, the method comprising: recovering a secondary filtrate comprising substantially the Group VIII soluble metal complex and a trace amount of Group VB and Group VIB metals; processing the primary filtrate in a primary sulfide precipitation method to form a primary solid residue and a primary liquid fraction and separately processing the secondary filtrate in a secondary sulfide precipitation method to form a secondary solid residue and a secondary liquid fraction; separating the primary solid residue from the primary liquid fraction and combining the primary solid residue with the used catalyst or shipping the primary solid residue off-site for treatment; separating the secondary solid residue from the secondary liquid fraction and leaching the secondary solid residue, such as by oxidation, to form a Group VIII product solution.

In a further aspect of the invention, the primary liquid fraction and the secondary liquid fraction are combined to form a combined solution substantially free of Group VB, Group VIB and Group VIII metals.

In another embodiment, the invention relates to a method for recovering vanadium, molybdenum, and nickel from the used catalyst and producing ammonium sulfate useful for other processes, such as fertilizer, the method comprising: all of the above processes and further comprising subjecting the combined solution to sulfamate hydrolysis and soluble sulfide species oxidation to recover a purified ammonium sulfate solution.

In another aspect, the invention relates to a method for recovering vanadium, molybdenum and nickel from a used catalyst, the method comprising the steps of: contacting the used catalyst with a leaching solution containing ammonia and air to dissolve the molybdenum and nickel into the leaching solution, forming a pressure leach slurry containing molybdenum and nickel metal complexes, ammonium sulphate and solid residue containing ammonium metavanadate and coke; separating and removing the solid residue containing ammonium metavanadate and coke from the pressure leach slurry; adjusting the pH of the pressure leach solution by the addition of sulfuric acid to precipitate at least a portion of the molybdenum and nickel as metal complexes; separating and recovering molybdenum and nickel metal complexes from the pressure leach solution containing 0.1 to 5% of the incoming molybdenum, 1 to 20% of the incoming vanadium, and 1 to 35% of the incoming nickel.

In another embodiment, the primary precipitation method comprises sulfidation, wherein $H_2S$ and a water soluble phosphate salt are added to the primary filtrate and the reaction is carried out at a sufficient temperature and pressure for a sufficient length of time at multiple pH values to substantially remove molybdenum, nickel and vanadium species from the ammonium sulfate to form a primary liquid fraction and a primary solid residue. In this embodiment the secondary filtrate is passed through the secondary precipitation method comprising sulfidation, wherein $H_2S$ is added to the secondary filtrate and the reaction is carried out at a sufficient temperature and pressure for a sufficient time and at a pH value sufficient to substantially remove nickel, molybdenum and vanadium species to form a secondary liquid fraction and a secondary solid residue. The primary liquid fraction, primary solid residue, secondary liquid fraction and secondary solid residue can be processed, in one embodiment, in accordance with the processes, described above, for recovery of substantial amounts of a Group VIII metal for formation of a combined solution substantially free of Group VB, Group VIB and Group VIII metals for producing ammonium sulfate useful for other processes.

DETAILED DESCRIPTION

Figure 1:
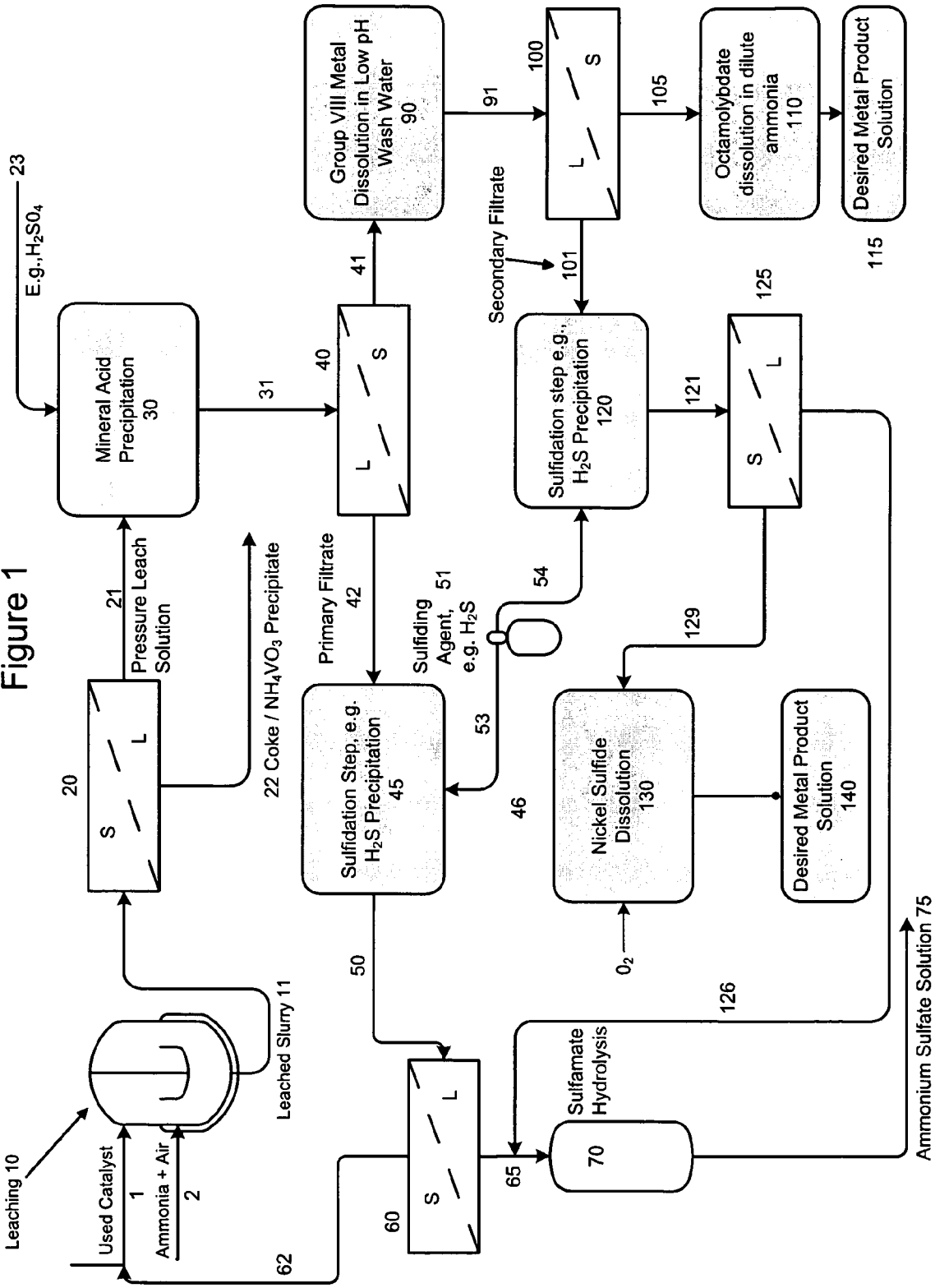
FIG. 1 provides an overview of an embodiment of the individual metal separation and recovery process.

The following terms will be used throughout the specification and will have the following meanings unless otherwise indicated.

As used herein, "hydroprocessing" is meant any process that is carried out in the presence of hydrogen, including, but not limited to, methanation, water gas shift reactions, hydrogenation, hydrotreating, hydrodesulfurization, hydrodenitrogenation, hydrodemetallation, hydrodearomatization, hydroisomerization, hydrodewaxing and hydrocracking including selective hydrocracking.

As used herein, the phrase "one or more of," or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and $Z_n$).

The Periodic Table referred to herein is the Table approved by TUPAC and the U.S. National Bureau of Standards. An example is the Periodic Table of the Elements by Los Alamos National Laboratory's Chemistry Division available as of the filing date of this Application at http://periodic.lan1.gov/default.htm.

Used Catalyst: In one embodiment, the used catalyst originates from a dispersed (bulk or unsupported) Group VIB metal sulfide catalyst containing at least one of: a Group VB metal such as V, Nb; a Group VIII metal such as Ni, Co; a Group VIIIB metal such as Fe; a Group IVB metal such as Ti; a Group IIB metal such as Zn, and combinations thereof. In another embodiment, the used catalyst originates from a dispersed (bulk or unsupported) Group VIB metal sulfide catalyst promoted with a Group VIII metal for hydrocarbon oil hydroprocessing. Promoters are typically added to a catalyst formulation to improve selected properties of the catalyst or to modify the catalyst activity and/or selectivity.

In another embodiment, the used catalyst originates from a bulk catalyst precursor of the formula $(X)_a(M)_b[(CH_3CH_2)_c N(CH_3)_3]_d O_z$ as disclosed in US Patent Publication No. 20060060502, wherein X is a Group VIII non-noble metal, M is selected from Mo and W, c is an integer from 10 to 40, the molar ratio of a:b is from 0.5/1 to 3/1. In another embodiment, the used catalyst originates from a hydroprocessing catalyst represented by the formula $(M^t)_a(X^u)_b(S^v)_d(C^w)_e(H^x)_f(O^y)_g$ $(N^z)_h$ as disclosed in U.S. patent application Ser. No. 11/931,972 with filing date of Oct. 31, 2007, wherein M represents at least one group VIB metal, such as Mo, W, etc. or a combination thereof, and X functions as a promoter metal, representing at least one of: a non-noble Group VIII metal such as Ni, Co; a Group VIIIB metal such as Fe; a Group VIB metal such as Cr; a Group IVB metal such as Ti; a Group IIB metal such as Zn, and combinations thereof (X is hereinafter referred to as "Promoter Metal"). Also in the equation, t, u, v, w, x, y, z representing the total charge for each of the component (M, X, S, C, H, O and N, respectively); ta+ub+vd+we+xf+yg+zh=0. The subscripts ratio of b to a has a value of 0 to 5 (0<=b/a<=5). S represents sulfur with the value of the subscript d ranging from (a+0.5b) to (5a+2b). C represents carbon with subscript e having a value of 0 to 11 (a+b). H is hydrogen with the value of f ranging from 0 to 7(a+b). O represents oxygen with the value of g ranging from 0 to 5(a+b); and N represents nitrogen with h having a value of 0 to 0.5(a+b). In one embodiment, a and b each is suitably greater than 0 such that the ratio of a:b is in the range of 1:5 to 10:1. In another embodiment, a=5; b=1 and b/a has a value of 0.2, for used catalyst compositions having precursors of the formulae $(M)_5(X)(S)_{5.5}$, $(M)_5(X)(S)_{5.5}(C)(H)(O)(N)$, $(M)_5(X)(S)_{27}(C)_{66}(H)_{42}(O)_{30}(N)_3$ amongst others. In one embodiment where both molybdenum and tungsten are present in the used catalyst as Group VIB metal complexes, the molybdenum:tungsten molar ratio is in the range of 9:1 to 1:9.

As used herein, the term "used catalyst" refers to a catalyst that has been used in a hydroprocessing operation and, as a result of such use, exhibits relatively lower or diminished catalytic activity. For example, if a reaction rate constant of a fresh catalyst at a specific temperature is assumed to be 100%, the reaction rate constant for a used catalyst temperature is 80% or less in one embodiment, and 50% or less in another embodiment. In one embodiment, the metal components of the used catalyst comprise at least one of Group VB, VIB, and VIII metals, e.g., vanadium, molybdenum, tungsten, nickel, and cobalt. The most commonly encountered metal to be recovered is molybdenum. In one embodiment, the metals to be recovered from the used catalyst are sulfides of Mo, Ni, and V.

In the sections that follow, the reference to "molybdenum" is by way of exemplification only for component (M) in the above formulae and is not intended to exclude other Group VIB metals/compounds and mixtures of Group VIB metal/compounds represented by (M) in the catalyst formula. Similarly, the reference to "nickel" is by way of exemplification only for the component (X) in the above formulae and is not meant to exclude other Promoter Metals, i.e., group VIII non-noble metal components; Group VIIIB metals; Group VIB metals; Group IVB metals; Group IIB metals and mixtures thereof that can be used in the catalyst formula.

As used herein, the reference to "vanadium" is by way of exemplification only for any Group VB metal component that may be added to the hydroprocessing catalyst or is present in the hydroprocessing feedstock, and is not intended to exclude other Group VB metals/compounds and mixtures of that may be present in the used hydroprocessing catalyst for metal recovery.

In the sections that follow, the reference to "incoming molybdenum" (or "incoming nickel," or "incoming vanadium," etc.) refers to the amount of metal that is initially present in the used catalyst prior to the metal recovery process.

In a hydroprocessing operation, a catalyst is typically enriched/deactivated with nickel and vanadium as "contaminants" in an amount ranging up to about 100 wt % of the fresh catalyst weight. In some operations, due to the rapid coke deposition rate, the catalyst is deactivated prior to achieving its full metals adsorption capacity. Such catalysts are taken out of service when the used catalyst contains as little as 10 wt % nickel plus vanadium compounds.

In one embodiment, the used catalyst is generally in the form of a dispersed suspension having an effective median particle size of 0.01 to 200 microns. In another embodiment, the used catalyst has an average particle size of 0.01 to 100 microns. In a third embodiment, the used catalyst is a dispersed slurry having an average particle size of 0.01 to 50 microns. In one embodiment, the used catalyst has a pore volume of 0.05-5 ml/g as determined by nitrogen adsorption.

FIG. 1 is a brief overview of one embodiment of the metal recovery process. Prior to metal recovery, used catalyst recovered from an upstream hydroprocessing unit in one embodiment is first washed/deoiled to remove from the used catalyst greater than 98 wt % of the hydrocarbons and product oils. The deoiling step is not shown in FIG. 1. Methods for deoiling/removing oils from solids containing used catalysts are known in the art. In one embodiment, the used catalyst is deoiled in contact with a sub-critical dense phase gas in a process as described in WO06117101A1. In another embodiment, the used catalyst is deoiled with the use of an organic solvent, e.g., xylene, benzene, toluene, kerosene, etc., under an inert atmosphere, and dried to remove the organic solvent. Following deoiling, the solvent is stripped and separated from the hydrocarbon oil and recycled. The recovered oil is recycled to the upstream hydroprocessing unit. In yet another embodiment, deoiling is carried out using separation techniques including membrane/ion exchange, nano-filtration, cross flow filtration and the like, reducing the hydrocarbon content to less than 2 wt %.

Leaching: In one embodiment, the deoiled and dried used catalyst particles in stream 1 are leached with an aqueous solution 2 containing ammonia with air injection in an autoclave 10, i.e., a multi-chambered and agitated vessel at a sufficient temperature and pressure to induce leaching reactions, wherein the group VIB and group VIII metals are leached into solution forming group VIB and group VIII soluble metal complexes. In one embodiment, up to 90% of the (incoming) group VB metal in the feed stays in the coke phase (following discharge from the autoclave) and up to 10% of the incoming group VB metal is leached into solution. For example, for a used catalyst feed stream containing 0.5 wt. % vanadium, up to 0.050 wt % ends up in the leach solution (based on the total weight of the feed stream).

In one embodiment, vanadium is converted into ammonium metavanadate, molybdenum is converted into molybdate compounds including ammonium orthomolybdate, and portions of nickel and cobalt (if any) are converted into amine complexes, e.g., cobalt amine sulfate, nickel amine sulfate, or the like, thereby being leached. In one embodiment, at least 70 wt % of the group VIB and group VIII metals are leached into solution. In another embodiment, at least 90 wt % of the nickel and molybdenum are leached into solution.

In one embodiment, as shown in FIG. 1, the deoiled and dried used catalyst in stream 1 is pressure leached according to US Patent Publication No. US2007/0025899, with the addition of ammonia and air in stream 2 to induce solubilization or leaching of metal sulfides from the used catalyst. In one embodiment of the ammoniacal pressure leach, the leaching is carried out at a pressure proportional to the temperature. In a second embodiment, the sufficient leach temperature is between 120 to 250° C. In a third embodiment, the sufficient leach temperature is between 135 to 225° C. In one embodiment, the sufficient autoclave pressure is in the range of 0-1200 psig. In a second embodiment, from 100-1000 psig. In a third embodiment from 300 psig through about 800 psig.

In one embodiment, the used catalyst particles are pressure leached from 60 minutes to 360 minutes. In another embodiment, the used catalyst particles are pressure leached from 120 minutes to 300 minutes. In a third embodiment, the pressure leach is for a period of less than 240 minutes.

In one embodiment, the concentration of the leaching species and the pH of the leach solution are optimized with sufficient amounts of ammonia to complex the nickel, molybdenum, vanadium and cobalt (if any), and with sufficient free ammonia to control the pH within a range of 9 to 13. In one embodiment, the molar ratio of ammonia to nickel (plus any cobalt, if present) plus molybdenum plus vanadium is in the range of 20:1 to 30:1. In another embodiment, the ammonia concentration is maintained at a level of at least 1 wt %, and in a range of 2-7 wt % in yet another embodiment.

In one embodiment, the pressure leaching is carried out in an ammoniacal media at a pressure ranging from 0 to 1200 psig, at a temperature ranging from 100-300° C., and at a pH level of 8.0 or higher in order to efficiently allow the leaching reaction to progress. In another embodiment, the pH level is maintained between a range of 9 to 12.

In another embodiment (not illustrated in the FIGURE), the used catalyst is first caustic leached under atmospheric pressure, according to U.S. Pat. No. 6,180,072, for an extended period of time before the pressure leaching step.

In yet another embodiment (not shown in the FIGURE), the leached slurry 11 following depressurization is transferred to a depositing/holding tank equipped with appropriate equipment to further reduce the leached slurry temperature to 90° C. or less, prior to the next separation step.

Separating/Recovering Vanadium: The partially cooled leached slurry 11 is transferred to a liquid-solid separator 20 and separated via physical methods known in the art, e.g., settling, centrifugation, decantation, or filtration using a vertical type centrifugal filter or a vacuum filter or a plate and frame filter, and the like, into a liquid stream 21 (Pressure Leach Solution/PLS) containing the group VIB and VIII metal complexes together with ammonium sulfate and a small amount of group VB metal complexes (up to 10 wt % of the incoming group VB metal); the solid residue 22 comprises coke and any group VB metal complex (up to 90 wt % of the incoming group VB metal). In one embodiment, the solid residue 22 comprises ammonium-containing vanadium salts such as ammonium metavanadate ($NH_4VO_3$) and coke. Vanadium, as $NH_4VO_3$, is subsequently reclaimed from the coke residue 22 (not shown in FIG. 1). The filtrate or PLS stream 21 is then subjected to a precipitation step in vessel 30.

In one embodiment, liquid-solid separation of the leached slurry 11 is carried out in a filtration device, wherein the solid residue 22 containing the $NH_4VO_3$ precipitate and coke is separated from the Pressure Leach Solution in the form of a filter cake. Group VB metals such as vanadium can be subsequently extracted/recovered from the filter cake, according to US Patent Publication No. US2007/0025899, by temperature and pH modification, wherein purified $NH_4VO_3$ is crystallized as a wet solid and subsequently dried and calcined into vanadium pentoxide pellets. The recovered vanadium has diverse industrial applications; including, use as a chemical catalyst, preparation of stainless/alloy steels, superconductive magnets and manufacturing of batteries.

Precipitating Metal Complexes from the Pressure Leach Solution (PLS):

In one embodiment following liquid-solid separation, the PLS stream 21 contains 10 to 100 gpL (grams per liter)

molybdenum, 1 to 20 gpL nickel, 0.05 to 2.0 gpL vanadium, and 50 to 1000 gpL ammonium sulfate. In a second embodiment, the PLS stream contains 20 to 100 gpL (grams per liter) molybdenum, 5 to 20 gpL nickel, 0.10 to 1.0 gpL vanadium, and 100 to 500 gpL ammonium sulfate.

In one embodiment of this step, the pH of the PLS 21 is controlled to a level at which selective precipitation of the metal complexes occurs ("pre-selected pH"), precipitating as metal complexes at least 90% of the Group VIB metal, at least 90% of the Group VIII metal, and at least 40% of the Group VB metal initially present prior to the precipitation. In one embodiment, about 50-80% of the vanadium leached into the PLS is recovered with the Mo—Ni precipitate with the rest remaining in solution. Up to 90% of the vanadium in solution can be subsequently recovered in an optional subsequent sulfidation step to further precipitate any molybdenum and nickel remaining in solution.

In one embodiment, the pH is adjusted to precipitate as metal complexes at least at least 95% of the Group VIB metal. In another embodiment, the pre-selected pH is less than about 3.5 to precipitate at least 90% of soluble molybdenum complexes. In another embodiment, the pre-selected pH is from 1.0 to about 2.0 to precipitate of at least 95% of soluble tungsten complexes. Generally, several metals can form a precipitate at a given pH. For example, at a pH level of less than 3, both Mo and Ni (and Co, if any) precipitate although more molybdenum precipitates relative to nickel. Additionally, the precipitating concept described herein can be repeated at another pH or pH range to precipitate other metals.

In one embodiment wherein the group VIB metal is molybdenum and there is an interest in precipitating most or a major portion of the molybdenum, the pH of the PLS 21 is reduced from greater than 9.0 to less than 3.5 to precipitate greater than 90% of the Mo. In a second embodiment, the pH of the PLS is adjusted to a level of 3.0 to 3.3 to precipitate greater than 92% of the Mo. In a third embodiment, the pH of the PLS is adjusted to a level of 2.65 to 3.0 to precipitate greater than 95% of the Mo.

In one embodiment, a strong mineral acid 23 is added to a precipitating/mixing vessel 30 to adjust the pH. In another embodiment (not shown), the acid is added to the pressure leach solution feed stream 21. The acid used to precipitate the metal complexes may include any inorganic mineral acid with a relatively high ionization constant. In one embodiment, the acid is used in a strength ranging from 1.0 to 12.0 normal. In another embodiment, the acid is selected from the group of sulfuric acid, hydrochloric acid, phosphoric acid, nitric acid, and the like.

In another embodiment (not shown), a sulfur compound having a sulfhydryl group or an ionized sulfhydryl group or a sulfur compound, which is capable of producing a sulfhydryl group or an ionized sulfhydryl group, is used to adjust the pH of the PLS and induce precipitation. Examples include but are not limited to any sulfur compound which has a sulfhydryl (—SH) group or an ionized sulfhydryl group (—S(−1)). Compounds containing a sulfhydryl or an ionized sulfhydryl group include hydrogen sulfide and inorganic compounds containing sulfide ion, hydrosulfide ion or trithiocarbonate ion as well as organic compounds such as dithiocarbamates, xanthates, mercaptans and the soluble metal salts of these compounds, i.e., the alkali metal and alkaline earth metal salts. Furthermore, sulfur compounds which are capable of producing a sulfhydryl or an ionized sulfhydryl group, e.g., thioacetamide and reducible disulfides, can also be used. Examples of organic sulfur compounds which can be used include sodium, potassium or calcium salts of the following ions: ethyl xanthate ion, glucose xanthate ion, isopropyl xanthate ion, dimethyldithiocarbamate ion or diethyldithiocarbamate ion. Examples of inorganic sulfur compounds include sodium trithiocarbonate, potassium trithiocarbonate, calcium trithiocarbonate, sodium sulfide, potassium sulfide or calcium sulfide.

In one embodiment (not shown), the sulfur compound is a sulfide-containing compound, e.g., a water soluble sulfide, a water soluble polysulfide, or mixtures thereof, is employed to adjust the pH of the Pressure Leach Solution 21 to a level at which precipitation of the metal complexes occurs. In one embodiment, hydrogen sulfide, a combination of hydrogen sulfide and caustic soda, ammonium sulfide, NaHS, or $Na_2S$, or mixtures thereof is used in an amount of about 0.05 to 0.2 molar to precipitate out nickel, molybdenum, cobalt, and the like from the Pressure Leach Solution 21.

In one embodiment, the precipitation in such vessel 30 is carried out under mixing conditions at a temperature in the range of 50 to 95° C., a pH level of 1 to 4, and for a sufficient amount of time, e.g., for at least 1 hour, for at least 90% of the molybdenum and nickel in the PLS to precipitate out as metal complexes. In another embodiment, the precipitation is carried out at a temperature of 80° C. and a pH level of between 2.5 to 3.3. In one embodiment, at least 95% of the molybdenum precipitates out after 2 hours as a molybdenum compound, such as ammonium octamolybdate. In another embodiment, at least 90% of the nickel precipitates out with the molybdenum as nickel ammonium sulfate.

In one embodiment, the pH of the PLS 21 undergoing precipitation and vessel 30 is continuously regulated for at least part of the precipitation step with the continuous addition of the additive, e.g., mineral acid or sulfide-containing compound, to control the rate of the precipitation as well as the type of metal complexes precipitating from the PLS 21.

In one embodiment, a sufficient amount of sulfuric acid (20-100% by weight) is used to adjust the pH of the PLS 21 to less than 3.5. In another embodiment, a sufficient amount of sulfuric acid is added to the PLS to target a pH of 3.0, with the mixture being maintained at a temperature of 60-90° C. for 1 to 3 hours, until 99% of the molybdenum precipitates out as molybdate compounds.

In the art pH controllers are known that can be used to automatically measure and control pH of the PLS for maximizing the amount of metals precipitated from the PLS. In one embodiment, a device using a volumetric sensor device is used to control and regulate the pH of the PLS.

Separating/Recovering Precipitate of Mo and Ni Metal Complexes:

After precipitation in vessel 30, the solid precipitate is separated from solution by known means 40 including settling, filtration, decantation, centrifugation etc., or combinations thereof, which in one embodiment generates a primary filtrate 42 comprising low concentrations of Group VB, Group VIB and Group VIII metals and a secondary solid residue 41 comprising Group VIB and Group VIII metal complexes, which is transferred to the vessel 90 for further separation.

In one embodiment, following solid-liquid separation, over 99% of the incoming molybdenum and over 90% of the incoming nickel are recovered in the unwashed precipitate 41. In another embodiment, over 98% of the incoming molybdenum and over 70% of the nickel is recovered in the unwashed precipitate 41.

In one embodiment, the unwashed precipitate 41 contains 25-50 wt % Mo, 2 to 10 wt % Ni, less than 0.5 wt % V, less than 35 wt % AmSul, 1 to 10 wt % S, with a Mo to Ni ratio ranging from 2.5:1 to 25:1. In yet another embodiment, the unwashed precipitate 41 contains up to 35 wt % Mo, 6 wt % Ni, less than 0.05 wt % V and about 30 wt % in Amsul, has a light greenish blue color and is soluble in hot ammoniacal solution.

In one embodiment, after liquid-solid separation, the cooled precipitate 41 is, optionally, doubled washed with acidic water (not shown in FIG. 1) at ambient temperature having a pH in the range of 1.5-3.5 to remove adhering Amsul (ammonium sulfate) that may be entrained in the Mo—Ni precipitate. A portion of the wash water may be recycled to the leaching step as feed to the autoclave. The remaining wash water may be added to the primary filtrate 42 for additional precipitation and recovery of the residual Mo and Ni in the filtrate.

In another embodiment, the solid precipitate 41, containing recovered metals, can be routed to a catalyst synthesis operation for the preparation of fresh catalysts. In another form of the invention, the solid precipitate 41 undergoes further processing in vessel 90 for separating nickel from other metals by acid dissolution, filtration and solvent extraction. In at least this embodiment, the filtered solids 41 comprise ammonium octamolybdate and a double salt of nickel ammonium sulfate, which can be washed in hot, acidified water for a sufficient time to enable dissolution of the double salt of nickel from the ammonium octamolybdate. In a further embodiment, a mixture of the dissolved double salt of nickel and the precipitated ammonium octamolybdate 91 is separated by suitable means 100 to recover, as a secondary filtrate 101, a solution of nickel and ammonium sulfate and the ammonium octamolybdate precipitate 105. In one embodiment the nickel, vanadium and ammonium sulfate levels are up-to 1.0 weight %, 0.10 weight % and 15 weight %, respectively in the secondary filtrate 101. In yet another embodiment (not shown), after a displacement wash of the octamolybdate solids 105 with fresh water, the nickel, vanadium and ammonium sulfate levels in the wash filtrate are up-to 0.5 weight %, 0.05 weight % and 5.0 weight %, respectively. In another embodiment, the octamolybdate solids 105, after at least a displacement wash exhibits 59.8% molybdenum, 0.05% nickel, 0.17% vanadium and 0.2% ammonium sulfate. In another embodiment, the octamolybdate solids are re-dissolved in vessel 110 in dilute ammonia at a temperature ranging from 50° C. to 75° C. to yield an ammonium molybdate product solution 115.

The primary filtrate 42 recovered from the separation step 40 is substantially free of Group VIB and Group VIII base metals. In one embodiment, substantially free means that the primary filtrate 42 recovered from the separation step contains 0.1 to 3% of the Group VIB metal in the used dispersed catalyst, 1 to 20% of the Group VB metal in the used dispersed catalyst, and 1 to 35% of the Group VIII metal in the used dispersed catalyst for metal recovery. In another embodiment, the primary filtrate 42 is primarily Amsul, with small amounts of molybdenum, vanadium, and nickel. In one embodiment, the primary filtrate 42 contains 0.1 to 2% of the incoming molybdenum, 1 to 15% of the incoming vanadium, and 1 to 30% of the incoming nickel. In another embodiment, the primary filtrate 42 contains from 0.1 to 1% of the incoming molybdenum, 1 to 10% of the incoming vanadium, and 1 to 15% of the incoming nickel.

In one form of the invention, a secondary filtrate 101 comprises primarily the double salt of nickel and Amsul and trace amounts of residual molybdenum and vanadium soluble complexes.

Sulfide Precipitation of Residual Mo and Ni: Sulfide precipitation of the primary filtrate and/or the secondary filtrate can be carried out, optionally, in any one or a combination of several embodiments of the invention. In one embodiment, the primary filtrate 42 is subjected to a primary sulfide precipitation method 45 and in another embodiment the secondary filtrate 101 is subjected to a secondary sulfide precipitation method 120. In one embodiment, the pH of the primary filtrate 42 (plus optional wash water from washing the precipitate) is adjusted to further precipitate as metal sulfides the metals remaining in the Amsul filtrate. In one embodiment, the pH in precipitation method 45 is adjusted to precipitate at least 95% of the Group VIB metal and at least 95% of the Group VIII metal initially present in the primary filtrate 42 prior to the precipitation.

In one embodiment of the primary precipitation method, which is carried out in multiple reactors designated as vessel 45, the pH is adjusted multiple times, from acidic-to-basic-to-acidic-to-basic, in the presence of $H_2S$ gas and diammonium hydrogen phosphate at 100 kPa $H_2S$ gas overpressure and a temperature of 100° C. for at least 90 minutes to obtain a precipitate of Mo, Ni, and V sulfides and oxy-hydroxides. In one manifestation of this embodiment, the primary precipitation method forms a mixture 50, comprising a primary liquid fraction and a primary solid residue, respectively, with the primary liquid fraction comprising very low concentrations of molybdenum, nickel and vanadium and primarily ammonium sulfate solution. In one embodiment, the primary solid residue and primary liquid fraction 50 are separated into their respective fractions in separator 60. In this embodiment the primary liquid fraction 65 is transferred to vessel 70, mixed with the secondary liquid fraction 126 to form a combined solution that in one embodiment is subject to oxydrolysis or sulfamate hydrolysis and soluble sulfide oxidation to form, in one embodiment, a purified ammonium sulfate solution 75.

In one embodiment, a water soluble sulfide-containing compound 51, e.g., a water soluble sulfide, a water soluble polysulfide, or mixtures thereof, is added to either one or both of the primary filtrate 42 and the secondary filtrate 101 (and recycled wash water, if any) with pH adjustment, thus precipitating the metals dissolved therein. In one embodiment, the primary filtrate 42 comprises low soluble nickel at less than 500 ppm and a combined concentration of molybdenum and vanadium at less than 1000 ppm and high ammonium sulfate content, in one embodiment from about 420 gpL to 470 gpL and in another embodiment about 450 gpL. In one embodiment the pH of the primary filtrate 42 is adjusted to range between 7.5 and 8.5 by the addition of ammonia prior to sulfidation and in another embodiment a salt of di-ammonium hydrogen phosphate (DAHP) is added prior to sulfidation. In one embodiment the primary precipitation method is carried out at a $H_2S$ overpressure from 100-kPa to 500-kPa and at a temperature ranging from 60° C. to 110° C. In this embodiment, the ammoniacal primary filtrate 42 is sulfided for up-to 30 minutes followed by acidification to a pH between 1.5 and 2.5 and sulfidation for up-to an additional 30-minutes followed by addition of ammonia, to increase the pH to up-to 8, and sulfidation for up-to an additional 30 minutes In another embodiment the secondary filtrate 101 comprising primarily the double salt of nickel sulfate, ammonium sulfate and trace amounts of soluble molybdenum and vanadium complexes is transferred to a sulfidation vessel 120 and subjected to a sulfide precipitation reaction in the presence of $H_2S$ gas, at a gas overpressure ranging from 100-kPa to 500-kPa, a temperature ranging from 90° C. to 110° C. at a pH ranging from 7.5 to 9.5 for about 30 minutes to 90 minutes to form a mixture 121 comprising the secondary liquid fraction 126 and a precipitate comprising the secondary solid residue 129. In another embodiment, the sulfidation reaction is carried in vessel 120 at a pressure of 100 kPa, a temperature of 100° C. and a pH ranging between 8 and 9 for 60 minutes. In at least this embodiment the mixture 121 is passed to separator 125 to obtain the secondary solid residue 129 and the secondary liquid fraction 126. In this embodiment, the secondary solid residue containing residual metal sulfides is separated from the ammonium sulfate (Amsul) solution by known means including settling, filtration, decantation, centrifugation, etc., or combinations thereof. In yet another embodiment, the secondary solid residue 129 comprising primarily of nickel sulfide is transferred to a pressure leaching reactor 130, wherein the pH of the residue is adjusted to a range between 4.5 and 5.5 and is pressure leached in the presence of oxygen at a temperature between 160° C. and 170° C. at a total pressure ranging from 1000 to 1200-kPa for up to two hours. In another manifestation of this process nickel sulfide solids are converted to a concentrated nickel sulfate solution having a pH of less than 1, a desired product solution 140. In one embodiment the conversion of nickel sulfide to nickel sulfate is in excess of 90%, in another embodiment conversion is in excess of 95% and in another embodiment conversion is about 99%.

The primary liquid fraction 65 recovered from one embodiment of the primary sulfide precipitation method is substantially free of Group VB, Group VIB and Group VIII metals, e.g., V, Mo and Ni. In one embodiment, substantially free means a removal rate of at least 90% for Group VB metals such as vanadium, and at least 95% for the Group VIB and Group VIII metals in the catalyst, e.g., molybdenum and nickel. In one embodiment, analysis of the primary liquid fraction 65, an ammonium sulfate solution, shows a concentration of 300 to 800 gpL Amsul, less than 100 ppm of the group VIB metals, less than 20 ppm of the Group VIII metals, less than 100 ppm of the Group VB metals, less than 500-ppm residual phosphorus and 20 to 80-gpL ammonium sulfamate (a herbicide). In a second embodiment, the primary liquid fraction (ammonium sulfate solution) 65 has a concentration of 200 to 600 gpL Amsul, less than 50 ppm Mo, less than 10 ppm Ni, and less than 50 ppm V, less than 300-ppm residual phosphorus and 10 to 60-gpL ammonium sulfamate. In a third embodiment, the primary liquid fraction 65 contains 100 to 1000 gpL ammonium sulfate, less than 100 ppm molybdenum, less than 10 ppm nickel, and less than 100 ppm vanadium, less than 400-ppm residual phosphorus and 5 to 100-gpL ammonium sulfamate.

In one embodiment, the water soluble sulfide-containing compound 51 is selected from the group of hydrogen sulfide, ammonium sulfide, NaHS, or $Na_2S$, or mixtures thereof. In another embodiment, hydrogen sulfide is used in an amount of about 0.05 to 0.2 molar to precipitate out nickel, molybdenum, cobalt, and the like from either one or both of the primary filtrate 42 and the secondary filtrate 101.

In another embodiment, the secondary liquid fraction 126 is combined with the primary liquid fraction 65 prior to oxydrolysis in vessel 70 and is subjected to sulfamate destruction by hydrolysis and soluble sulfide oxidation in the presence of steam at a temperature ranging between 210 and 250° C., a pressure ranging from 2,000-kPa to 4,000-kPa and a retention time of between 0.5-hour and 1.5-hour to produce a purified ammonium sulfate product 75 suitable for further processing, such as for fertilizer.

In one embodiment, a filter press or other suitable means of separation 60 is used to separate the metal sulfide precipitates 62 from the ammonium sulfate solution 65. In one embodiment the primary solid residue 62 is transferred directly to the used catalyst feed 1 for additional leaching in autoclave 10 or transferred to other processes for metals reclamation. Alternatively, in another embodiment, the solids 62, containing precipitated metal sulfides, are sent to a holding tank or surge tank (not shown in FIG. 1) for subsequent metals recovery through the autoclave 10. In another embodiment, the solids 62, containing precipitated metal sulfides, are sent to a holding tank for off-site disposal or metals reclamation.

EXAMPLES

The following illustrative examples are intended to be non-limiting.

Example 1

In this example, a PLS (deep blue color) stream with a pH of 9.2 was adjusted to ~3.0 by single stage concentrated sulfuric acid (96%) addition. The PLS composition included 33 gpL free $NH_3$, 80.9 gpL Mo, 7.9 gpL Ni, 0.17 gpL V and 277 gpL ammonium sulfate (Amsul). After mixing for about 2-hours at a temperature of 70° C., about 99% of the molybdenum precipitates out as a molybdenum compound. Approximately 98% of the residual Ni also precipitates out with the molybdenum. It is believed that the compound is a mixture of ammonium octamolybdate and nickel ammonium sulfate.

The slurry is cooled to ambient and filtered to remove the precipitate. The precipitate is optionally double-washed with pH 3.0 water at ambient temperature to remove entrained ammonium sulfate. During the washing step, an additional 23% of Ni re-solubilizes to achieve a final Ni recovery of about 75%. Minimal re-solubilization of Mo occurs. The final solution (including wash) analyzes 0.53 gpL Mo, 1.49 gpL Ni, and 0.08 gpL V, for a metal precipitation efficiency of 99.2% Mo, 76.4% Ni, and 27.9% V.

The precipitate, appearing as light greenish with blue tinges, is soluble in warm ammoniacal solution. An analysis of the washed precipitated solids reveals a moisture content of 34.2 wt %, metals content on a dry basis of 42.6 wt % Mo, 3.17 wt % Ni, minimal V (less than 0.02 wt %), 6.8 wt % Amsul, 3.4 wt % S and a Mo/Ni ratio of 13.4.

In the next step, a portion of the wash water is recycled to the autoclave feed. The remaining wash water and filtrate, which is primarily ammonium sulfate (Amsul), contain low levels of Mo & V together with moderate amounts of Ni. The solution pH is increased to about 7 with ammonia addition followed by sulfidation with an $H_2S$ gas overpressure of 200-kPa (30-psi) for 2-hours. The pH is maintained between 6 & 7 at a temperature of 80° C. following which a precipitate of Mo, Ni and V sulfides and oxy-hydroxides is obtained. The slurry undergoes liquid-solid separation and the Amsul stream is further processed for recovering ammonium sulfate for use as fertilizer. Analysis of the final Amsul stream depicts 440 gpL Amsul, with 45 ppm Mo, less than 5 ppm Ni, and 26 ppm V.

Following precipitation, filtering and washing of the sulfided solids, the cake containing recovered metal sulfides is stored in a tank as autoclave feed inventory. It can also be sent for off-site disposal to metals reclaimers.

Example 2

Example 1 is repeated with a PLS stream having a pH of 10.6, containing 53 gpL free $NH_3$, 85 gpL Mo, 8.24 gpL Ni, 0.40 gpL V and 271 gpL ammonium sulfate (Amsul). The PLS stream pH is adjusted to 2.71. The final solution (including wash) shows 0.48 gpL Mo, 1.44 gpL Ni, and 0.08 gpL V, for a metal precipitation efficiency of 99.2% Mo, 77.3% Ni, and 75% V. The washed precipitated solids show a moisture content of 25.9 wt %, metals content on a dry basis of 41.8 wt % Mo, 3.37 wt % Ni, 0.16 wt % V, 3.8 wt % AmSul, 2.76 wt % S and a Mo/Ni ratio of 12.4.

After sulfidation, the final Amsul stream concentration reveals 500 gpL Amsul, with 41 ppm Mo, less than 5 ppm Ni, and 26 ppm V.

Example 3

In this example 3, Example 1 is substantially replicated (although example number two could be substituted) as set out in paragraphs 063-066 with the addition, however, of separate liquid-solid separation and sulfidation steps as follows: A PLS stream with a pH of 9.2 was adjusted to 3.0 by single stage concentrated sulfuric acid (96%) addition. The PLS composition included 33 gpL free $NH_3$, 80.9 gpL Mo, 7.9 gpL Ni, 0.17 gpL V and 277 gpL ammonium sulfate (Amsul). After mixing for about 2-hours at a temperature of 80° C., about 99% of the molybdenum precipitates out as a molybdenum compound. Approximately 98% of the residual Ni also precipitates out with the molybdenum resulting in a precipitated mixture or slurry comprising ammonium octamolybdate and a double salt of nickel ammonium sulfate and, following liquid-solid separation of the cooled slurry, a primary filtrate material containing low levels of molybdenum, nickel and vanadium.

The molybdate/and nickel precipitate is soluble in hot ammoniacal solution. An analysis of the washed precipitated solids reveals a moisture content of 34.2 wt %, metals content on a dry basis of 42.6 wt % Mo, 3.17 wt % Ni, minimal V (less than 0.02 wt %), 6.8 wt % Amsul, 3.4 wt % S and a Mo/Ni ratio of 13.4. To obtain a purified molybdate product solution the residue was repulped at 25-wt % solids in hot (80° C.) pH 2 acidified water for 30-minutes enabling dissolution of the double salt of nickel from the ammonium octamolybdate solids as per the following reaction:

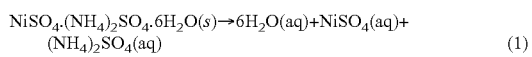

$$NiSO_4 \cdot (NH_4)_2SO_4 \cdot 6H_2O(s) \rightarrow 6H_2O(aq) + NiSO_4(aq) + (NH_4)_2SO_4(aq) \qquad (1)$$

The resulting mixture was filtered to separate the undissolved octamolybdate solids from the nickel and ammonium sulfate solution comprising the secondary filtrate. Table 1 shows Ni, V and ammonium sulfate levels of 0.36-wt %, 0.16-wt % and 4-wt % respectively in the repulped and filtered octamolybdate cake. A displacement wash of the solids with fresh water lowers Ni, V and ammonium sulfate levels to 0.05-wt %, 0.17-wt % and 0.2-wt % respectively in the octamolybdate cake. During the washing step greater than 99% of Ni and Amsul re-dissolved from the cake. Minimal re-dissolution of Mo and V occurred from the octamolybdate cake.

TABLE 1

Repulp-Displacement Wash Data for Separating Ni & Amsul from Octamolybdate Solids

| Mo | Ni | V | Ammonium Sulfate |
|---|---|---|---|
| Unwashed solids from Mo—Ni Precipitation from PLS (wt. %) | | | |
| 35 | 3.5 | 0.1 | 24 |
| Mo—Ni Solids Repulping @25 wt. % solids & pH 2 water @80° C. - Filtrate Analyses | | | |
| 0.25 | 3.5 | 0.014 | 88 |
| Mo—Ni Solids Repulping @25 wt % solids & pH 2 water @80° C. - Solid Analyses | | | |
| 55.6 | 0.36 | 0.16 | 4 |
| Repulped Cake Displacement Wash, pH 2, water @60° C., L:S ratio 1.6:1 - Wash Water Analyses | | | |
| 2.1 | 4.7 | 0.01 | 45 |
| Repulped Cake Displacement Wash, pH 2, water @60° C., L:S ratio 1.6:1 - Solids Analyses | | | |
| 59.8 | 0.05 | 0.17 | 0.2 |

The octamolybdate solids are re-dissolved in hot, dilute ammonia to yield ammonium molybdate product as per the following reaction:

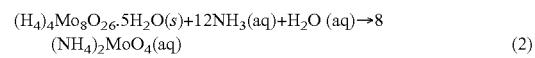

$$(H_4)_4Mo_8O_{26} \cdot 5H_2O(s) + 12NH_3(aq) + H_2O\,(aq) \rightarrow 8(NH_4)_2MoO_4(aq) \qquad (2)$$

The primary filtrate from the initial step, which is acidic and contains low soluble Mo, Ni & V values and high ammonium sulfate content and the secondary filtrate of nickel and ammonium sulfate solution, which is also acidic and contains low soluble Mo & V and high Ni and ammonium sulfate content, were subjected to separate sulfidation processes to ensure elimination of metal values from the desired ammonium sulfate product solution. Regarding the primary filtrate, Table 2 presents batch results from several tests on semi-synthetic solutions or pilot plant sulfided effluent, partially depleted of metals content and made up with synthetic metals to represent the primary filtrate. The data show that the precipitate of Ni as NiS did not undergo significant re-solubilization at both acidic and ammoniacal ranges. Test 1, as shown in Table 2, indicates that continuous sulfidation of the primary filtrate, at neutral to ammoniacal pH, does not lower Mo & V values to acceptable concentrations in the Amsul effluent.

TABLE 2

Sulfidation of Ammonium Sulfate (450 gpL) solutions containing ~1000 ppm Mo, Ni & V -- Addition of DAHP

| Test No. | Feed Type | $H_2S$ O.P. Kpa | Temp. °C. | DAHP as P ppm | Time min | pH | Ni ppm | V ppm | Mo ppm | Final Total Metals ppm | Residual P ppm |
|---|---|---|---|---|---|---|---|---|---|---|---|
| 1 | Semi Synthetic Solution | 100 (14.5 Psi) | 100 | 0 | 0 | 6.7 | 340.0 | 150.0 | 578.0 | 204.1 | 0 |
| | | | | | 40 | 6.6 | 0.3 | 131.2 | 76.2 | | 0 |
| | | | | | 60 | 8.0 | 0.4 | 130.0 | 72.6 | | 0 |
| | | | | | 80 | 8.1 | 0.7 | 130.4 | 73.0 | | 0 |
| 2 | Semi Synthetic Solution | 100 (14.5 Psi) | 100 | 0 | 0 | 2.5 | 300.0 | 150.0 | 600.0 | 231.8 | 0 |
| | | | | | 40 | 2.4 | 264.0 | 149.0 | 50.0 | | 0 |
| | | | | | 60 | 8.0 | 2.3 | 117.0 | 130.0 | | 0 |
| | | | | | 80 | 8.3 | 1.8 | 111.0 | 119.0 | | 0 |

TABLE 2-continued

Sulfidation of Ammonium Sulfate (450 gpL) solutions containing ~1000 ppm Mo, Ni & V -- Addition of DAHP

| Test No. | Feed Type | H$_2$S O.P. Kpa | Temp. °C. | DAHP as P ppm | Time min | pH | Ni ppm | V ppm | Mo ppm | Final Total Metals ppm | Residual P ppm |
|---|---|---|---|---|---|---|---|---|---|---|---|
| 3 | Semi Synthetic Solution | 100 (14.5 Psi) | 100 | 0 | 0 | 8.5 | 320.0 | 150.0 | 560.0 | 75.5 | 0 |
|   |   |   |   |   | 40 | 2.1 | 2.3 | 129.6 | 0.8 |   | 0 |
|   |   |   |   |   | 60 | 8.4 | 4.2 | 105.0 | 19.9 |   | 0 |
|   |   |   |   |   | 80 | 8.4 | 4.4 | 57.7 | 13.4 |   | 0 |
| 4 | Semi Synthetic Solution | 100 (14.5 Psi) | 100 | 7000 | 0 | 3.1 | 292.0 | 150.0 | 495.0 | 53.7 | 7000 |
|   |   |   |   |   | 40 | 2.8 | 1.4 | 13.4 | 4.6 |   | 6572 |
|   |   |   |   |   | 60 | 8.3 | 0.9 | 4.9 | 45.3 |   | 5310 |
|   |   |   |   |   | 80 | 8.2 | 1.0 | 5.4 | 47.3 |   | 5270 |
| 5 | Semi Synthetic Solution | 100 (14.5 Psi) | 100 | 1500 | 0 | 6.5 | 300.0 | 150.0 | 536.0 | 16.9 | 1322 |
|   |   |   |   |   | 40 | 2.2 | 1.0 | 152.0 | 0.8 |   | 1368 |
|   |   |   |   |   | 60 | 8.6 | 0.5 | 5.5 | 5.7 |   | 940 |
|   |   |   |   |   | 80 | 8.5 | 0.9 | 6.4 | 9.6 |   | 940 |
| 6 | Semi Synthetic Solution | 100 (14.5 Psi) | 100 | 1500 | 0 | 7.8 | 300.0 | 150.0 | 514.0 | 13.5 | 1473 |
|   |   |   |   |   | 40 | 2.0 | 1.1 | 131.4 | 1.4 |   | 1356 |
|   |   |   |   |   | 60 | 7.8 | 0.3 | 10.8 | 4.5 |   | 1040 |
|   |   |   |   |   | 80 | 8.2 | 0.3 | 7.5 | 5.7 |   | 980 |
| 7 | Semi Synthetic Solution | 100 (14.5 Psi) | 100 | 340 | 0 | 7.6 | 254.0 | 150.0 | 444.0 | 8.5 | 340 |
|   |   |   |   |   | 40 | 2.0 | 1.2 | 143.0 | 1.4 |   | 394 |
|   |   |   |   |   | 60 | 7.0 | 0.1 | 2.3 | 2.1 |   | 250 |
|   |   |   |   |   | 80 | 8.1 | 0.1 | 6.5 | 1.9 |   | 250 |
| 8 | Semi Synthetic Solution | 100 (14.5 Psi) | 100 | 495 | 0 | 8.6 | 345.0 | 150.0 | 520.0 | 5.8 | 495 |
|   |   |   |   |   | 40 | 2.2 | 0.7 | 134.0 | <0.1 |   | 456 |
|   |   |   |   |   | 60 | 7.7 | <0.1 | 5.8 | <0.1 |   | 300 |
| 9 | Semi Synthetic Solution | 100 (14.5 Psi) | 100 | 261 | 0 | 8.5 | 345.0 | 150.0 | 520.0 | 4.9 | 261 |
|   |   |   |   |   | 40 | 2.2 | 0.2 | 92.4 | <0.1 |   | 261 |
|   |   |   |   |   | 60 | 7.5 | <1 | 4.9 | <0.1 |   | 170 |

Test 2, as shown in Table 2, shows that high Mo levels in the sulfided effluent were a result of not initially adjusting the acidic feed solution pH to the basic domain. Vanadium levels were untouched in this pH sequence zone. Test 3 demonstrates that Mo levels may be reduced in the sulfided effluent by adjusting the incoming solution pH during sulfidation from acidic-to-ammoniacal-to acidic and finally to the basic domain over 90-minutes. Vanadium levels remained high. Test 4 revealed that introduction of diammonium hydrogen phosphate (DAHP) lowered V to acceptable levels in the sulfided effluent. Although Mo levels were high as a result of not adjusting the initial acidic feed solution pH to within the ammoniacal region, metal values were significantly lower than Test 2 indicating positive synergies with phosphate addition.

Follow-up analyses (Table 2, Tests 5-9) indicated the following conditions were suitable for lowering Mo & V to acceptable levels in the Amsul stream. The primary acidic filtrate, containing less than 500 ppm nickel, less than 1000 ppm molybdenum and vanadium combined and a high ammonium sulfate content of at least 450 gpL, was adjusted to a pH of about 8.0 and mixed with less than 1,500 ppm of a salt of di-ammonium hydrogen phosphate (DAHP). The mixture was then sulfided with H$_2$S at a gas overpressure of 100 kPa and a temperature of 100° C. for 20 minutes. The pH of the solution was then adjusted to approximately 2.0 with sulfuric acid followed by additional sulfidation under the same conditions. A final pH adjustment to about 8.0 was made with dilute ammonia again followed by sulfidation for an additional 20 minutes under the same conditions. Under these conditions, the following molybdenum reaction chemistry is believed to occur:

From the initial acidic mode and with the injection of ammonia and H$_2$S at 100° C., Mo$^{+6}$ soluble species are converted to the tetrathiomolybdate complex as per:

$$Mo^{+6}(aq)+2NH_3(aq)+4H_2S\ (g)\rightarrow(H_4)_2MoS_4(aq)+6H \quad (1)$$

Following readjustment of pH to the acidic range, the tetrathiomolybdate complex is converted into insoluble molybdenum trisulfide as per:

$$(NH_4)_2MoS_4(aq)+H_2SO_4(aq)\rightarrow MoS_3\downarrow+(NH_4)_2SO_4(aq)+H_2S\ (aq) \quad (2)$$

Some dissolution of the molybdenum trisulfide would be expected, and has been observed, on readjusting the acidic slurry pH to the ammoniacal end as per:

$$MoS_3(s)+H_2S+2NH_3\rightarrow(NH_4)_2MoS_4(aq) \quad (3)$$

The phosphate (DAHP) could additionally precipitate solubilized Mo species as phosphomolybdate in the alkaline range as per the reaction:

$$12Mo^{+6}(aq)+HPO_4^{2-}(aq)+3NH_3\ (aq)+36OH^-\rightarrow(NH_4)_3\ PO_4.12MoO_3.3H_2O\downarrow+34H^+ \quad (4)$$

(Ammonium Phosphomolybdate)

The following vanadium reaction chemistry is thought to occur:

From the initial acidic mode and with the injection of ammonia and H$_2$S at 100° C., V$^{+5}$ species partially forms the soluble tetrathiovanadate complex as per:

$$NH_4VO_3(aq)+4H_2S\ (aq)+2NH_3(aq)\rightarrow(H_4)_3VS_4(aq)+3H_2O(aq) \quad (5)$$

Following readjustment of pH to the acidic range, partial conversion of the tetrathiomolybdate complex to the insoluble vanadium pentasulfide is probable as per:

$$2(NH_4)_3VS_4(aq)+H_2SO_4(aq)\rightarrow V_2S_5\downarrow+3(NH_4)_2SO_4(aq)+H_2S\ (aq) \quad (6)$$

Additionally, at the acidic pH, V+5 species could be reduced to the blue soluble vanadyl sulfate complex as per:

$$2NH_4VO_3(aq)+H_2S(aq)+3H_2SO_4(aq)\rightarrow V_2O_2(SO_4)_2(aq)+(NH_4)_2SO_4(aq)+S°\downarrow4H_2O \quad (7)$$

and/or precipitation of V (IV) oxide as per:

$$2NH_4VO_3(aq)+H_2S\,(aq)\rightarrow V_2O_4(s)+2\,NH_3(aq)+S^0\downarrow+2H_2O\,(aq) \quad (8)$$

On readjusting the acidic slurry pH to the ammoniacal end, some precipitation is expected to occur as dark grey colored hypovanadic acid as per:

$$V_2O_2(SO_4)_2(aq)+4\,NH_3(aq)+4H_2O\rightarrow V_2O_2(OH)_4\downarrow+2(H_4)_2SO_4(aq) \quad (9)$$

and/or conversion of V (IV) oxide to the soluble metavanadate, as per:

$$V_2O_4(s)+2\,NH_3(aq)+S^0+2H_2O(aq)\rightarrow 2NH_4VO_3(aq)+H_2S(aq) \quad (10)$$

However, the excess quantities of vanadium ions present through tests 1-3 (Table 2) suggests that the extent of reactions 6, 8 and 9 were minimized under existing conditions, with the likelihood of reactions 5, 7 and 10 predominating.

The sulfided ammonium sulfate slurry undergoes liquid-solid separation. The liquid portion is an ammonium sulfate stream, containing less than 10-ppm total metals content, up-to 45-gpL sulfamate and up-to 1,000-ppm soluble sulfides, is further processed, such as by air oxidation and sulfamate hydrolysis, for recovering a purified ammonium sulfate product for other uses, such as fertilizer. In a final step, the solid residue remaining from separation may, optionally be recycled to the initial ammonia pressure leach for further recovery and separation of metals or transferred to other processes, such as disposal or reclamation. It is believed that the solids generated from sulfidation of the primary filtrate might contain contaminants, such as As and Cd, that could build-up over time in the circuit and potentially contaminate the ammonium molybdate, nickel sulfate and Amsul products. By including two sulfide precipitation circuits, the primary sulfidation step acts as a purge to remove from the entire system contaminants that may then be shipped off-site for disposal.

Results of the secondary filtrate sulfidation process are shown in Table 3. The acidic secondary filtrate contains nickel levels of approximately 26 gpL, 100 gpL ammonium sulfate and less than 100 ppm of molybdenum and vanadium combined. The acidic solution pH is increased to 8 with ammonia addition followed by sulfidation with H$_2$S gas at an overpressure of 100-kPa for less than 1-hour.

The pH is maintained between 7 and 8.5 at a temperature of 100° C. which results in a precipitate of Mo, Ni and V compounds according to the following reactions:

$$Ni(NH_3)_2SO_4(aq)+H_2S\,(g)\rightarrow NiS\downarrow+(NH_4)_2SO_4(aq) \quad (11)$$

$$2NH_4VO_3(aq)+H_2S\,(aq)\rightarrow V_2O_4\downarrow+2NH_3(aq)+S^0\downarrow+2H_2O\,(aq) \quad (12)$$

and/or $$NH_4VO_3(aq)+4H_2S\,(aq)+2NH_3(aq)\rightarrow(NH_4)_3VS_4(aq)+3H_2O(aq) \quad (13)$$

$$(NH_4)_2MoO_4(aq)+3H_2S\,(aq)\rightarrow MoS_3(s)+4H_2O\,(aq)+2NH_3(aq) \quad (14)$$

and/or $$(NH_4)_2MoO_4(aq)+3H_2S\,(aq)\rightarrow(NH_4)_2MoS_4(aq)+4H_2O \quad (15)$$

As Table 3 indicates, all three metals precipitated to <5-ppm levels in the sulfided ammonium sulfate stream; although higher V and Mo levels may be present in the ammonium sulfate stream (as a result of reactions 13 & 15), it is believed that high volumes of generated NiS (>40,000-ppm) from reaction 11 acted as a co-precipitant to, at least partially, remove both Mo & V from the solution phase.

The sulfided ammonium sulfate slurry was then separated in a liquid-solid separation step and the secondary ammonium sulfate stream, containing less than 5-ppm total metals content, was combined with the primary Amsul stream and further processed, by air oxidation and sulfamate hydrolysis, for recovering a purified ammonium sulfate product for other uses, such as fertilizer. Analysis of the final ammonium sulfate stream indicated 400 gpL ammonium sulfate, with less than 10 ppm of combined soluble Mo, Ni and V species.

The filtered solids were washed with fresh water to remove adhering ammonium sulfate and soluble sulfides and repulped to a density of ~20-wt % solids. The slurry was acidified to a pH ~5 and introduced into a reactor for pressure leaching with oxygen gas at 165° C. and a total pressure of 1,100 kPag (160-psig). Table 4 illustrates complete conversion of the NiS solids into nickel sulfate within 1-hour with the product solution at an acidic pH of less than 1. The following reactions are believed to occur:

$$NiS(s)+2O_2(g)\rightarrow NiSO_4 \quad (16)$$

$$V_2O_4\,(s)+2H_2SO_4(aq)\rightarrow 2VOSO_4(aq)+2H_2O \quad (17)$$

$$S^0+3O_2(g)\,2H_2O\,(aq)\rightarrow 2H_2SO_4 \quad (18)$$

$$(NH_4)_2S\,(aq)+2O_2(g)\rightarrow(NH_4)_2SO_4 \quad (19)$$

TABLE 3

Sulfidation of Ammonium Sulfate Solutions (100 gpL) with Ni (26 gpL) & Low Mo/V (<100 ppm)

| Test | Feed Type | H2S overpressure Kpa | Temp °C. | Time Min | pH | Mo mg/L | Ni mg/L | V mg/L | Total mg/L |
|---|---|---|---|---|---|---|---|---|---|
| 1 | Batch pilot sulfidation | 100 ~14.5 psi | 100 | 0 40 | 8.1 8.0 | 50 <1 | 26,500 <1 | 15 <1 | 26,565 <1 |
| 2 | Batch pilot sulfidation | 100 ~14.5 psi | 100 | 0 40 | 8.4 8.0 | 42 <1 | 25,700 <1 | 12 <1 | 25,754 <1 |

$$MoS_3\,(s)+6O_2(g)+4H_2O(aq)\rightarrow H_2MoO_4(aq)+3H_2SO_4 \quad (20a)$$

and/or $$(H_4)_2MoS_4(aq)+8O_2+4H_2O\rightarrow H_2MoO_4(aq)+(NH_4)_2SO_4(aq)+3H_2SO_4(aq) \quad (20b)$$

TABLE 4

Oxidation of NiS Cake from Sulfidation Step

| Test # | Temp °C. | $O_2$ Pressure Psi | Total Pressure Psig | Wt. % Solids | Initial pH | Final pH | Retention Time Hrs | Final Ni gpL | Ni Extm % |
|---|---|---|---|---|---|---|---|---|---|
| 1 | 165 | 72 | 159 | 21.9 | 4.5 | 0.9 | 2 | 75.1 | >99% |
| 2 | 165 | 72 | 159 | 17 | 5.6 | 0.87 | 1 | 56.0 | >99% |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of recovering metals from a used catalyst comprising the steps of:

(a) leaching a Group VB metal, a Group VIB metal and a Group VIII metal from the used catalyst with an ammonia containing leach solution at a temperature and a pressure sufficient to form a pressure leach slurry comprising at least a Group VIB soluble metal complex and at least a Group VIII soluble metal complex and a first solid residue;

(b) separating and removing the first solid residue from the pressure leach slurry to form a first pressure leach solution comprising the Group VIB soluble metal complex and the Group VIII soluble metal complex;

(c) precipitating from the first pressure leach solution a second solid residue comprising at least a portion of the Group VIB soluble metal complex to form a first slurry comprising the second solid residue and at least a portion of the Group VIII soluble metal complex;

(d) separating from the first slurry the second solid residue and a primary filtrate substantially free of Group VB, Group VIB and the Group VIII metals;

(e) dissolving the second solid residue to form a group VIB metal precipitate and a group VIII metal containing solution;

(f) separating the group VIB metal precipitate from the Group VIII metal containing solution of step (e);

(g) dissolving said Group VIB metal precipitate in a dilute base at a sufficient temperature to form a Group VIB metal product.

2. The method of claim 1 wherein the step (f) further comprises:

(i) forming a secondary filtrate comprising substantially ammonium sulphate, the Group VIII soluble metal complex and trace amounts of Group VB and Group VIB metals;

(ii) processing the primary filtrate in a primary precipitation method to form a primary solid residue and a primary liquid fraction and separately processing the secondary filtrate in a secondary precipitation method to form a secondary solid residue and a secondary liquid fraction;

(iii) separating the primary solid residue from the primary liquid fraction and combining the primary solid residue with the used catalyst of step (a) of claim 1;

(iv) separating the secondary solid residue from the secondary liquid fraction and dissolving the secondary solid residue to form a Group VIII product solution.

3. The method of claim 2 further comprising combining the primary liquid fraction and the secondary liquid fraction to form a combined solution substantially free Group VB, Group VIB and Group VIII metals.

4. The method of claim 3 further comprising subjecting the combined solution to sulfamate hydrolysis and sulfide oxidation at a temperature between 220° C. and 240° C., a pressure ranging from 2,000-kPa to 4,000-kPa and a retention time of between 0.5-hour and 1.5-hour to form a purified solution.

5. The method of claim 4 wherein the purified solution is ammonium sulfate.

6. The method of claim 1 wherein the precipitation step (c) is carried out at a pH not more than 3.0, at a temperature between about 75° C. and 85° C. for at least two hours.

7. The method of claim 1 wherein the first solid residue comprises at least a Group VB metal, a Group VB metal complex and Coke.

8. The method of claim 7, wherein the Group VB metal comprises vanadium and the Group VB metal complex comprises ammonium metavanadate.

9. The method of claim 1 wherein the separation steps (b), (d) and (f) each comprise at least a separation means selected from settling, filtration, decantation, centrifugation and combinations thereof.

10. The method of claim 1, wherein the primary filtrate comprises substantially ammonium sulfate and about 0.1 to 3% of the Group VIB metal in the used catalyst for metal recovery, about 1 to 20% of the Group VB metal in the used catalyst for metal recovery, and about 1 to 35% of the Group VIII metal in the used catalyst for metal recovery.

11. The method of claim 2 wherein the primary precipitation method comprises sulfidation with a sulfur containing compound and a phosphate at a temperature and pressure and for a time sufficient to remove at least 90% of the Group VB metals and at least 95% of the Group VIB and Group VIII metals.

12. The method of claim 11 wherein the phosphate is a salt of di-ammonium hydrogen phosphate which is added to the primary filtrate immediately prior to sulfidation.

13. The method of claim 11 wherein the primary filtrate comprises less than 500 ppm nickel and less than 1000 ppm of molybdenum and vanadium combined with an ammonium sulfate content of at least 400 gpL, the pH is initially adjusted to approximately 8 with ammonia and the primary precipitation method comprises sulfidation carried out at 100 kPa overpressure with hydrogen sulfide gas at a temperature between about 90° C. and 110° C. for 80 to 100 minutes and the pH is adjusted at least 2 times from basic to acidic and from acidic to basic.

14. The method of claim 2 wherein the secondary precipitation method comprises sulfidation with a sulfur containing compound at a temperature and pressure and for a time sufficient to remove at least 90% of the Group VB metals and at least 95% of the Group VIB and Group VIII metals.

15. The method of claim 14 wherein the sulfidation is carried out with hydrogen sulfide gas at an overpressure of 100 kPa, at a temperature between 90° C. and 120° C. at a pH between 8 and 9 and between 50 and 80 minutes.

16. The method of claim 2, wherein the separation steps (iii) and (iv) are separation means selected from settling, filtration, decantation, centrifugation and combinations thereof.

17. The method of claim 3 wherein the combined solution comprises less than 100 ppm of the group VIB metal, less than 20 ppm of the Group VIII metal, and less than 100 ppm of the Group VB metal.

18. The method of claim 1, wherein at least 90% of the Group VIB metal precipitates from the pressure leach solution as a metal complex.

19. The method of claim 1, wherein the Group VIB metal is molybdenum and wherein the first pre-selected pH is in the range of 2.5 to 3.3 to precipitate greater than 90% of the molybdenum as an octamolybdate complex.

20. The method of claim 19, wherein the pressure leach solution is adjusted to the first pre-selected pH by adding to said solution at least one of a mineral acid or a sulfur compound having a sulfhydryl group or an ionized sulfhydryl group, or mixtures thereof.

21. The method of claim 20, wherein the pH of the PLS is adjusted to a pH of 3.5 or less with an acid selected from the group of sulfuric acid, hydrochloric acid, phosphoric acid and nitric acid.

22. The method of claim 20, wherein the PLS is adjusted to a pH of 3 or less with the addition of a sulfuric acid to precipitate at least 95% of the molybdenum as an octamolybdate complex.

23. The method of claim 20, wherein the pH of the pressure leach solution is adjusted to a pH of 3 or less with at least one of a water soluble sulfide, a water soluble polysulfide, or mixtures thereof.

24. The method of claim 2, wherein the Group VIB metal in the used catalyst is molybdenum, the Group VIII metal in the used catalyst is nickel, the Group VB metal in the used catalyst is vanadium, the pressure leach solution is adjusted to a pH of 3.5 or less with the addition of a sulfuric acid to precipitate and form the second solid residue comprising at least 95% of the molybdenum as an octamolybdate complex and at least 75% of the nickel as a nickel ammonium sulfate compound, dissolving the second solid residue in an acidic water having a pH of 2.5 or less at a temperature ranging between 75° C. and 85° C. to form an octamolybdate precipitate and a solution of a double salt of nickel and dissolving the octamolybdate precipitate in dilute ammonia at a temperature ranging from 50° C. to 75° C. to form an ammonium molybdate product.

25. The method of claim 24 further comprising: separating the octamolybdate precipitate from the double salt of nickel solution to form the secondary filtrate comprising at least 80% of the nickel present in the used catalyst, from 0.1 to 3% of the molybdenum present in the used catalyst and from 1 to 20% of the vanadium present in the used catalyst; adding $H_2S$ to the secondary filtrate at a gas overpressure ranging from 100-kPa to 500-kPa and at a temperature ranging from 50-110° C. to precipitate the secondary solid residue comprising Mo, Ni, and V sulfides and oxy-hydroxides, obtain the secondary liquid fraction comprising 100 to 1000 gpL ammonium sulfate, less than 100 ppm molybdenum, less than 20 ppm nickel, and less than 100 ppm vanadium; separating the secondary solid residue and the secondary liquid fraction; dissolving the secondary solid residue at a pH of five or less in the presence of oxygen at a temperature between 150° C. and 170° C., a total pressure ranging from 150 psig to 170 psig for a time between 30 minutes and 1.5 hours to obtain a nickel sulfate product solution having a pH of less than 1; combining the secondary liquid fraction with the primary liquid fraction to form a combined solution; subjecting the combined solution to sulfamate hydrolysis and soluble sulfide species oxidation in the presence of steam and air at a temperature ranging between 220° C. and 240° C. to form a purified solution comprising of ammonium sulfate.

26. The method of claim 13, wherein the primary filtrate comprises less than 400 ppm nickel and less than 1000 ppm of molybdenum and vanadium combined and an ammonium sulfate content of at least 400 gpL, the pH is initially adjusted to approximately 8 with ammonia; the primary precipitation method comprises sulfidation carried out between 90 kPa and 110 kPa overpressure with hydrogen sulfide gas at a temperature between about 90° C. and 110° C. for 60 to 80 minutes and the pH is adjusted at least 2 times from basic to acidic and from acidic to basic to form a primary liquid fraction and a primary solid residue; separating the primary liquid fraction and the primary solid residue; transferring the primary solid residue to step (a) of claim 1; combining the primary liquid fraction with the secondary liquid fraction to form the combined solution; subjecting the combined solution to sulfamate hydrolysis and sulfide oxidation in the presence of steam and air at a temperature ranging between 220° C. and 240° C. to form a purified solution comprising ammonium sulfate.

27. The method of claim 2, wherein at least one of a water soluble sulfide, a water soluble polysulfide, or mixtures thereof is added to the secondary filtrate for a pH level of between 6 and 9 to obtain Mo, Ni, and V sulfide and oxy-hydroxide precipitates from the ammonium sulfate solution.

28. The method of claim 13, wherein $H_2S$ is added to the primary filtrate at a gas overpressure from 100-kPa to 500 kPa and at a temperature ranging from about 90° C. to about 110° C.

29. A method of recovering metals from a used catalyst originating from a hydroprocessing catalyst having a general formula $(X)_a(M)_b[(CH_3CH_2)_cN(CH_3)_3]_dO_z$ and containing at least a group VB metal, wherein X is a Group VIII non-noble metal, M is a group VIB metal selected from Mo and W and combinations thereof, c is an integer from 10 to 40, the molar ratio of a:b is from 0.5/1 to 3/1, the method comprising the steps of:
(a) leaching a Group VB metal, a Group VIB metal and a Group VIII metal from the used catalyst with an ammonia containing leach solution at a first selected pH and at a temperature and a pressure sufficient to form a pressure leach slurry comprising at least a Group VIB soluble metal complex and at least a Group VIII soluble metal complex and a first solid residue;

(b) separating and removing the first solid residue from the pressure leach slurry to form a first pressure leach solution comprising the Group VIB soluble metal complex and the Group VIII soluble metal complex;

(c) precipitating from the first pressure leach solution a second solid residue comprising at least a portion of the Group VIB soluble metal complex to form a first slurry comprising at least a portion of the Group VIII soluble metal complex;

(d) separating from the first slurry the second solid residue and a primary filtrate substantially free of Group VB, Group VIB and the Group VIII metals;

(e) dissolving the second solid residue to form a group VIB metal precipitate and a group VIII metal containing solution;

(f) separating the group VIB metal precipitate from the Group VIII metal containing solution of step (e) and (g) dissolving said Group VIB metal precipitate in a dilute base at a sufficient temperature to form a Group VIB metal product.

30. The method of claim 29, further comprising the steps of:

(i) forming a secondary filtrate comprising substantially ammonium sulphate, the Group VIII soluble metal complex and trace amounts of Group VB and Group VIB metals;

(ii) processing the primary filtrate in a primary precipitation method to form a primary solid residue and a primary liquid fraction and separately processing the secondary filtrate in a secondary precipitation method to form a secondary solid residue and a secondary liquid fraction;

(iii) separating the primary solid residue from the primary liquid fraction and combining the primary solid residue with the used catalyst of step (a) of claim 1;

(iv) separating the secondary solid residue from the secondary liquid fraction and dissolving the secondary solid residue to form a Group VIII product solution.

31. The method of claim 29, wherein the Group VIB metal is molybdenum and wherein the first pre-selected pH is in the range of 2.5 to 3.3 to precipitate greater than 90% of the molybdenum.

32. The method of claim 29, wherein the used catalyst originating from a hydroprocessing catalyst having a median particle size of 0.01 to 200 microns.

33. The method of claim 29, wherein the used catalyst has a pore volume of 0.05-5 ml/g as determined by nitrogen adsorption.

34. A method of recovering metals including vanadium from a used catalyst having a general formula $(M^t)_a(X^u)_b$ $(S^v)_d(S^v)_d(C^w)_e(H^x)_f(O^y)_g(N^z)_h$, containing at least a Group VB metal, wherein M is at least one group VIB metal, X is at least one of a non-noble Group VIII metal, a Group VIIIB metal, a Group VIB metal, a Group IVB metal, and a Group IIB metal, $0=<b/a=<5$, $(a+0.5b)<=d<=(5a+2b)$, $0<=e<=11(a+b)$, $0<=f<=7(a+b)$, $0<=g<=5(a+b)$, $0<=h<=0.5(a+b)$; t, u, v, w, x, y, z, each representing total charge for each of: M, X, S, C, H, O and N, respectively; $ta+ub+vd+we+xf+yg+zh=0$;

(a) leaching a Group VB metal, a Group VIB metal and a Group VIII metal from the used catalyst with an ammonia containing leach solution at a first selected pH and at a temperature and a pressure sufficient to form a pressure leach slurry comprising at least a Group VIB soluble metal complex and at least a Group VIII soluble metal complex and a first solid residue;

(b) separating and removing the first solid residue from the pressure leach slurry to form a first pressure leach solution comprising the Group VIB soluble metal complex and the Group VIII soluble metal complex;

(c) precipitating from the first pressure leach solution a second solid residue comprising at least a portion of the Group VIB soluble metal complex to form a first slurry comprising at least a portion of the Group VIII soluble metal complex;

(d) separating from the first slurry the second solid residue and a primary filtrate substantially free of Group VB, Group VIB and the Group VIII metals;

(e) dissolving the second solid residue to form a group VIB metal precipitate and a group VIII metal containing solution;

(f) separating the group VIB metal precipitate from the Group VIII metal containing solution of step (e) and dissolving said Group VIB metal precipitate in a dilute base at a sufficient temperature to form a Group VIB metal product;

(g) forming a secondary filtrate comprising substantially ammonium sulphate, the Group VIII soluble metal complex and trace amounts of Group VB and Group VIB metals;

(h) processing the primary filtrate in a primary precipitation method to form a primary solid residue and a primary liquid fraction and separately processing the secondary filtrate in a secondary precipitation method to form a secondary solid residue and a secondary liquid fraction;

(i) separating the primary solid residue from the primary liquid fraction and combining the primary solid residue with the used catalyst of step (a) of claim 1;

(j) separating the secondary solid residue from the secondary liquid fraction and dissolving the secondary solid residue to form a Group VIII product solution.

* * * * *